(12) United States Patent
Vankamamidi et al.

(10) Patent No.: US 11,755,233 B2
(45) Date of Patent: Sep. 12, 2023

(54) SYSTEM AND METHOD FOR MEMORY MANAGEMENT USING MEMORY DEVICE CLEANSING

(71) Applicant: EMC IP Holding Company, LLC, Hopkinton, MA (US)

(72) Inventors: Vamsi K. Vankamamidi, Hopkinton, MA (US); Bruce E. Caram, Hudson, MA (US); Ajay Karri, South Grafton, MA (US); Alexei Karaban, Northborough, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 4 days.

(21) Appl. No.: 17/239,243

(22) Filed: Apr. 23, 2021

(65) Prior Publication Data
US 2022/0357871 A1    Nov. 10, 2022

(51) Int. Cl.
G06F 3/00 (2006.01)
G06F 3/06 (2006.01)
G06F 12/02 (2006.01)

(52) U.S. Cl.
CPC .......... G06F 3/0652 (2013.01); G06F 3/0604 (2013.01); G06F 3/0679 (2013.01); G06F 12/023 (2013.01)

(58) Field of Classification Search
CPC .... G06F 3/0652; G06F 3/0646; G06F 3/0655; G06F 3/0604; G06F 12/023
See application file for complete search history.

(56) References Cited

U.S. PATENT DOCUMENTS 10,409,682 B1 * 9/2019 Davies ................ G06F 11/1092

* cited by examiner

*Primary Examiner* — Reginald G Bragdon
*Assistant Examiner* — Michael L Westbrook
(74) *Attorney, Agent, or Firm* — Brian J. Colandreo; Heath M. Sargeant; Holland & Knight LLP

(57) ABSTRACT

A method, computer program product, and computing system for identifying a first memory device source that includes first content; identifying a second memory device source that include second content; and initiating a first iteration of a memory device cleansing procedure wherein first content and at least a first portion of the second content are moved to a first unused memory device.

18 Claims, 5 Drawing Sheets

SYSTEM AND METHOD FOR MEMORY MANAGEMENT USING MEMORY DEVICE CLEANSING

TECHNICAL FIELD

This disclosure relates to storage systems and, more particularly, to systems and methods for managing memory within storage systems.

BACKGROUND

Storing and safeguarding electronic content is of paramount importance in modern business. Accordingly, various methodologies may be employed to protect and distribute such electronic content within storage systems.

In order to ensure the consistent performance and operation of these storage systems, the available storage space within these storage systems may be defragmented to maximize the amount of contiguous storage space available for these storage operations, thus avoiding inefficient use of such storage resources.

SUMMARY OF DISCLOSURE

In one implementation, a computer-implemented method is executed on a computing device and includes: identifying a first memory device source that includes first content; identifying a second memory device source that include second content; and initiating a first iteration of a memory device cleansing procedure wherein first content and at least a first portion of the second content are moved to a first unused memory device.

One or more of the following features may be included. A third memory device source may be identified that includes third content. A second iteration of the memory device cleansing procedure may be initiated wherein at least a second portion of the second content and at least a first portion of the third content are moved to a second unused memory device. Additional memory device sources may be identified that include additional content. Additional iterations of the memory device cleansing procedure may be initiated wherein portions of the additional content are moved from the additional memory device sources to additional unused memory devices. Identifying a memory device source may include: identifying a utilization level of the memory device source. Identifying a memory device source may include: identifying a backpointer utilization level for a backpointer associated with the memory device source based, at least in part, upon an estimated usage of the memory device source. Identifying a memory device source may include: identifying a backpointer utilization level for a backpointer associated with the memory device source based, at least in part, upon an actual usage of the memory device source. Identifying a memory device source may include: identifying a backpointer utilization level for a backpointer associated with the memory device source based, at least in part, upon a mapped page count of the backpointer.

In another implementation, a computer program product resides on a computer readable medium and has a plurality of instructions stored on it. When executed by a processor, the instructions cause the processor to perform operations including: identifying a first memory device source that includes first content; identifying a second memory device source that include second content; and initiating a first iteration of a memory device cleansing procedure wherein first content and at least a first portion of the second content are moved to a first unused memory device.

One or more of the following features may be included. A third memory device source may be identified that includes third content. A second iteration of the memory device cleansing procedure may be initiated wherein at least a second portion of the second content and at least a first portion of the third content are moved to a second unused memory device. Additional memory device sources may be identified that include additional content. Additional iterations of the memory device cleansing procedure may be initiated wherein portions of the additional content are moved from the additional memory device sources to additional unused memory devices. Identifying a memory device source may include: identifying a utilization level of the memory device source. Identifying a memory device source may include: identifying a backpointer utilization level for a backpointer associated with the memory device source based, at least in part, upon an estimated usage of the memory device source. Identifying a memory device source may include: identifying a backpointer utilization level for a backpointer associated with the memory device source based, at least in part, upon an actual usage of the memory device source. Identifying a memory device source may include: identifying a backpointer utilization level for a backpointer associated with the memory device source based, at least in part, upon a mapped page count of the backpointer.

In another implementation, a computing system includes a processor and memory is configured to perform operations including: identifying a first memory device source that includes first content; identifying a second memory device source that include second content; and initiating a first iteration of a memory device cleansing procedure wherein first content and at least a first portion of the second content are moved to a first unused memory device.

One or more of the following features may be included. A third memory device source may be identified that includes third content. A second iteration of the memory device cleansing procedure may be initiated wherein at least a second portion of the second content and at least a first portion of the third content are moved to a second unused memory device. Additional memory device sources may be identified that include additional content. Additional iterations of the memory device cleansing procedure may be initiated wherein portions of the additional content are moved from the additional memory device sources to additional unused memory devices. Identifying a memory device source may include: identifying a utilization level of the memory device source. Identifying a memory device source may include: identifying a backpointer utilization level for a backpointer associated with the memory device source based, at least in part, upon an estimated usage of the memory device source. Identifying a memory device source may include: identifying a backpointer utilization level for a backpointer associated with the memory device source based, at least in part, upon an actual usage of the memory device source. Identifying a memory device source may include: identifying a backpointer utilization level for a backpointer associated with the memory device source based, at least in part, upon a mapped page count of the backpointer.

The details of one or more implementations are set forth in the accompanying drawings and the description below.

Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
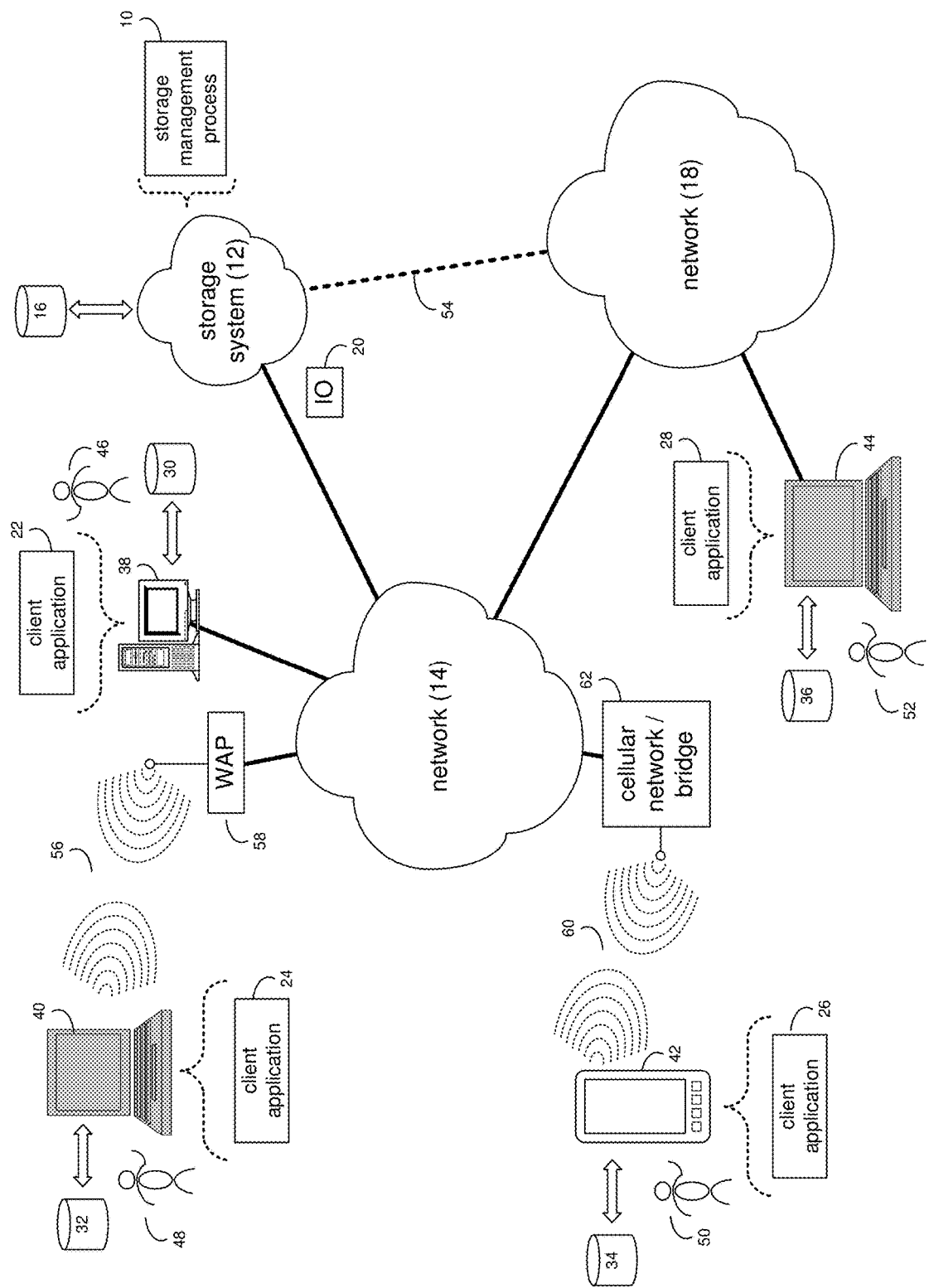
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a storage appliance, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

Figure 2:
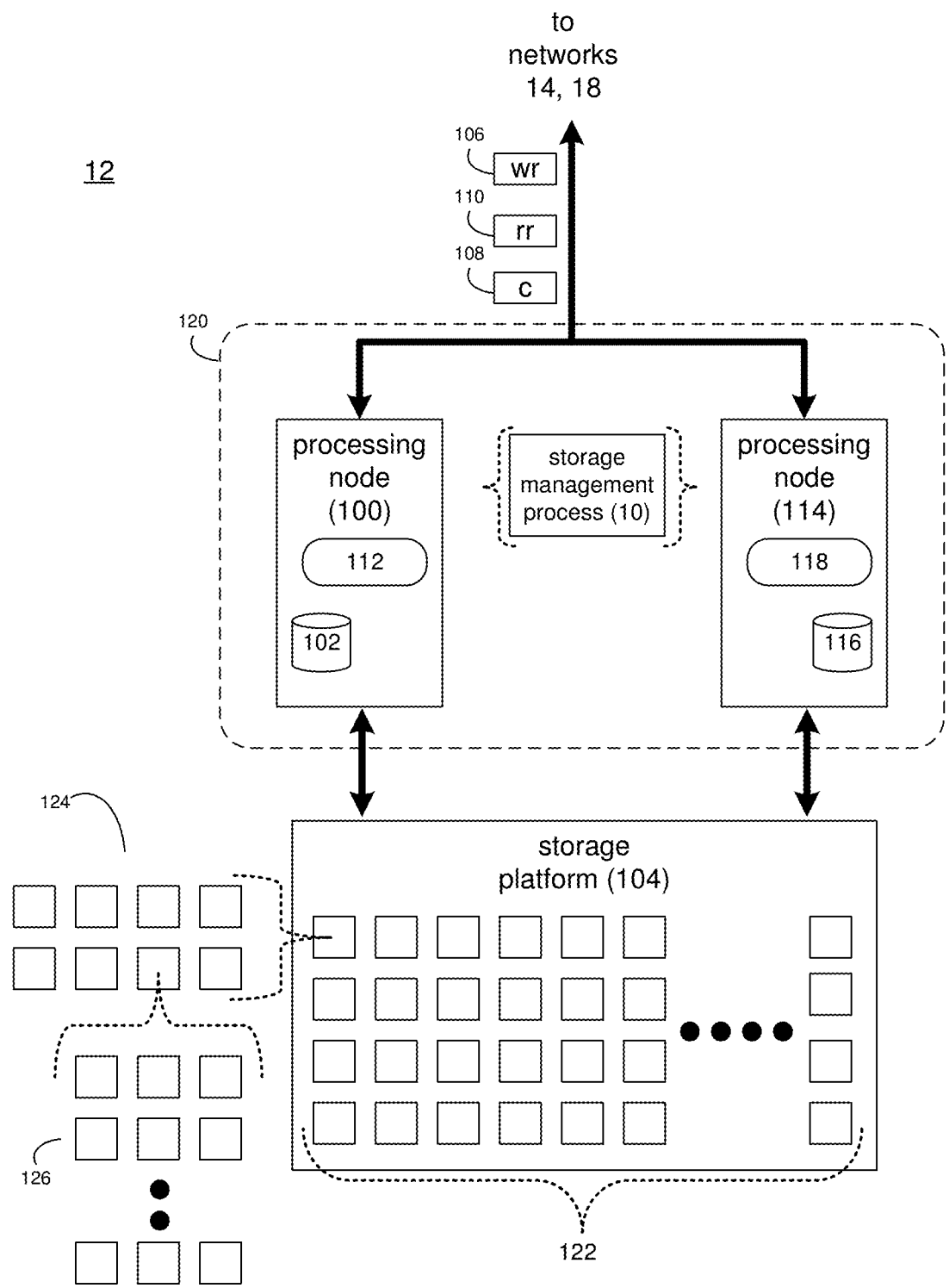
FIG. 2 is a diagrammatic view of the storage system of FIG. 1.

The Data Storage System:

Referring also to FIG. 2, there is shown a general implementation of storage system 12. In this general implementation, storage system 12 may include processing node 100. An example of processing node 100 may include but is not limited to a processing node within a storage appliance. As is known in the art, a storage appliance is a type of computing appliance that provides data to (or manages data for) other network-connected computing devices. Processing node 100 may be configured to perform computational tasks and may be configured to store data locally (on local storage 102) or within storage platform 104.

Depending upon the manner in which storage system 12 is configured, storage platform 104 may include a single storage device (such as a single hard disk drive or a single solid state storage device) or may include a plurality of storage devices that are configured to provide various levels of performance and/or high availability. For example and if storage platform 104 includes a plurality of storage devices (e.g., hard disk drives and/or solid state storage devices), this plurality of storage devices may be configured to form a RAID storage array utilizing various standard RAID structures (e.g., RAID 0, RAID 1, RAID 3, RAID 5, RAID 6, RAID 7 or RAID 10), thus providing a higher level of performance and/or availability.

Storage system 12 may be configured to execute all or a portion of storage management process 10. The instruction sets and subroutines of storage management process 10, which may be stored on a storage device (e.g., storage device 102) coupled to e.g., processing node 100, may be executed by one or more processors (not shown) and one or more memory architectures (not shown) included within processing node 100. Storage device 102 may include but is not limited to: a hard disk drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 106 (i.e. a request that content 108 be written to storage system 12) and data read request 110 (i.e. a request that content 108 be read from storage system 12).

During operation of processing node 100, content 108 to be written to storage system 12 may be processed by processing node 100. Additionally/alternatively and when storage system 12 is configured as an application server, content 108 to be written to storage system 12 may be internally generated by processing node 100.

Processing node 100 may include cache memory system 112. Examples of cache memory system 112 may include but are not limited to a volatile, solid-state, cache memory system (e.g., a static RAM cache memory system) and/or a non-volatile, solid-state, cache memory system (e.g., a flash-based, cache memory system). Processing node 100 may initially store content 108 within cache memory system 112. Depending upon the manner in which cache memory system 112 is configured, processing node 100 may immediately write content 108 to local storage 102 or storage platform 104 (if cache memory system 112 is configured as a write-through cache) or may subsequently write content 108 to local storage 102 or storage platform 104 (if cache memory system 112 is configured as a write-back cache).

Storage system 12 may be configured to include a plurality of processing nodes, each of which may be configured to receive, generate and/or process content (e.g., content 108). For example and in addition to processing node 100, storage system 12 may include one or more additional processing nodes (e.g., processing node 114). An example of processing node 114 may include a processing node within a storage appliance. Processing node 114 may be configured to perform computational tasks and may be configured to store data locally (on local storage 116) or within storage platform 104.

Processing node 114 may include cache memory system 118. Examples of cache memory system 118 may include but are not limited to a volatile, solid-state, cache memory system (e.g., a static RAM cache memory system) and/or a non-volatile, solid-state, cache memory system (e.g., a flash-based, cache memory system). Processing node 114 may initially store content 108 within cache memory system 118. Depending upon the manner in which cache memory system 118 is configured, processing node 114 may immediately write content 108 to local storage 116 or storage platform 104 (if cache memory system 118 is configured as a write-through cache) or may subsequently write content 108 to local storage 116 or storage platform 104 (if cache memory system 118 is configured as a write-back cache).

Processing node 100 and (in this example) processing node 114 may be included within a single storage appliance (e.g., storage appliance 120), thus allowing storage appliance 120 to provide a level of high availability. Processing nodes 110, 114 may be configured in an active-active fashion, wherein each of processing nodes 110, 114 may simultaneously process the various IO requests (e.g. IO request 20). As discussed above, examples of IO request 20 may include but are not limited to data write request 106 (i.e. a request that content 108 be written to storage system 12) and data read request 110 (i.e. a request that content 108 be read from storage system 12).

Storage platform 104 may be constructed of a plurality of discrete storage portions (e.g., discrete storage portions 122), an example of which may include but is not limited to an uber (e.g., a 64 gigabyte portion of storage). Each of these discrete storage portions (e.g., discrete storage portions 122) may be constructed of a plurality of discrete sub-portions (e.g., sub-portions 124), an example of which may include but is not limited to a sub-uber (e.g., an 8 gigabyte portion of storage, eight of which may make up a 64 gigabyte uber). Each of these discrete sub-portions (e.g., sub-portions 124) may be constructed of a plurality of smaller storage portions (e.g., smaller portions 126), an example of which may include but is not limited to a physical large block (e.g., a 2 megabyte portion of storage, four-thousand of which may make up an 8 gigabyte sub-portion).

Figure 3:
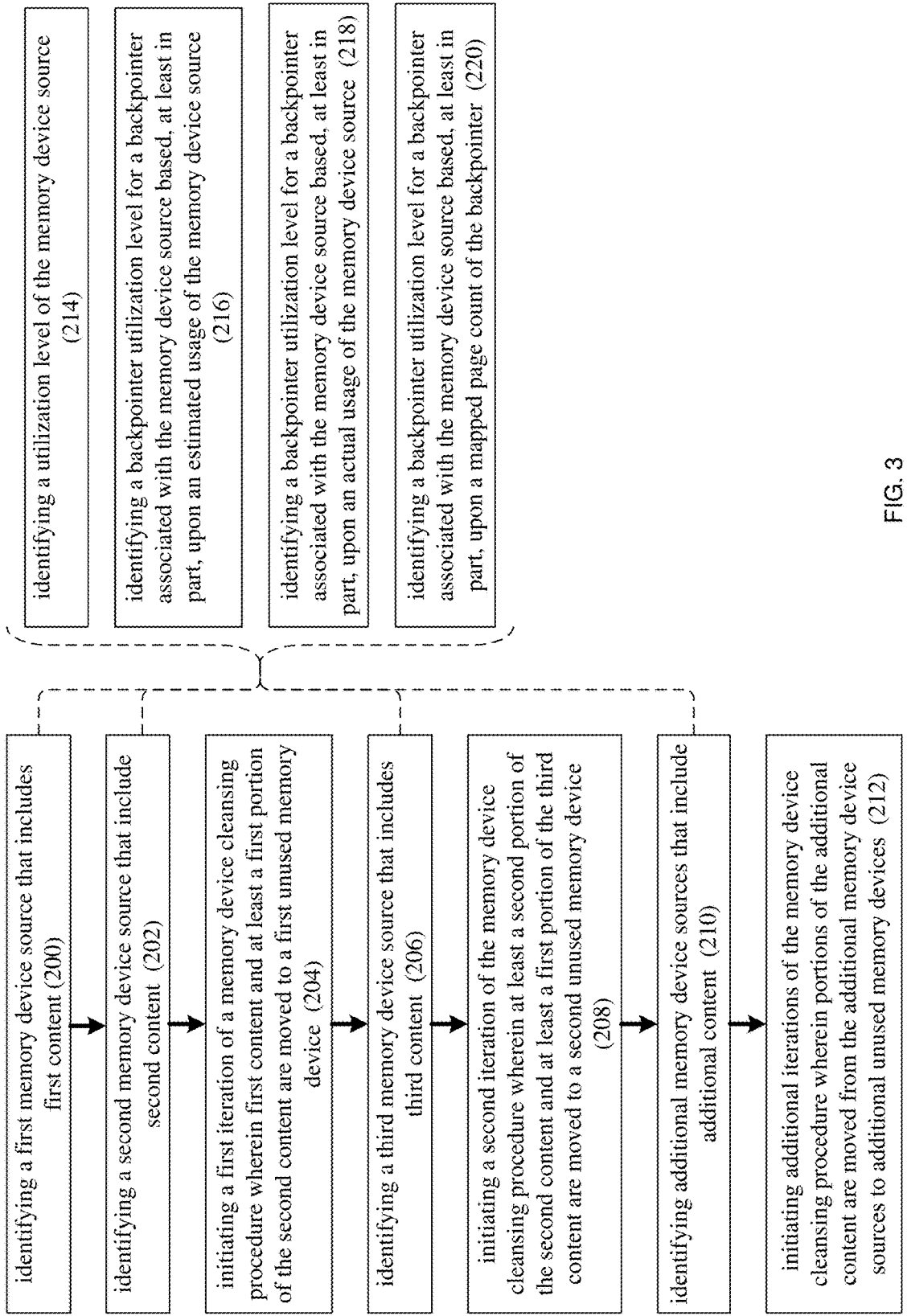
FIG. 3 is a flow chart of the storage management process of FIG. 1.

Storage Management Process:

Referring also to FIG. 3, storage management process 10 may define a quantity of discrete storage portions (e.g., discrete storage portions 122) within a storage system (e.g., storage system 12). As discussed above, storage platform 104 may be constructed of a plurality of discrete storage portions (e.g., discrete storage portions 122), wherein each of the plurality of discrete storage portions (e.g., discrete storage portions 122) may be available to storage management process 10 for storing content (e.g., content 108). As also discussed above, each of these discrete storage portions (e.g., discrete storage portions 122) may be constructed of a plurality of discrete sub-portions (e.g., sub-portions 124), wherein each of these discrete sub-portions (e.g., sub-portions 124) may be constructed of a plurality of smaller storage portions (e.g., smaller portions 126).

Unfortunately, content 108 will often be written to a contiguous block of storage space within storage platform 104, as writing all of content 108 to a contiguous block of storage space is less computationally-expensive than breaking content 108 into a plurality of smaller content portions that are written to a plurality of smaller blocks of storage space. Further, if content 108 is only written to a contiguous block of storage space within storage platform 104, such a writing methodology would result in inefficient use of storage platform 104.

As will be discussed below in greater detail, in order to enhance the utilization of discrete storage portions 122, sub-portions 124 and/or smaller portions 126, content stored within discrete storage portions 122, sub-portions 124 and/or smaller portions 126 may be periodically rearranged to fill holes and/or open up larger contiguous blocks of storage in discrete storage portions 122, sub-portions 124 and/or smaller portions 126.

For the following example, assume that storage management process 10 wishes to defragment smaller portions 126, which make up sub-portions 124, which make up discrete storage portions 122. As is known in the art, defragmentation is a process that reduces the degree of fragmentation in file systems. Defragmentation is accomplished by physically organizing the contents of a storage device used to store files into the smallest number of contiguous regions (e.g., fragments, extents). Defragmentation also attempts to create larger regions of free space using compaction to impede the return of fragmentation. Further assume that storage management process 10 wishes to increase the number of smaller portions 126 that have no content stored within them, as content may be more easily written to contiguous storage space.

Figure 4:
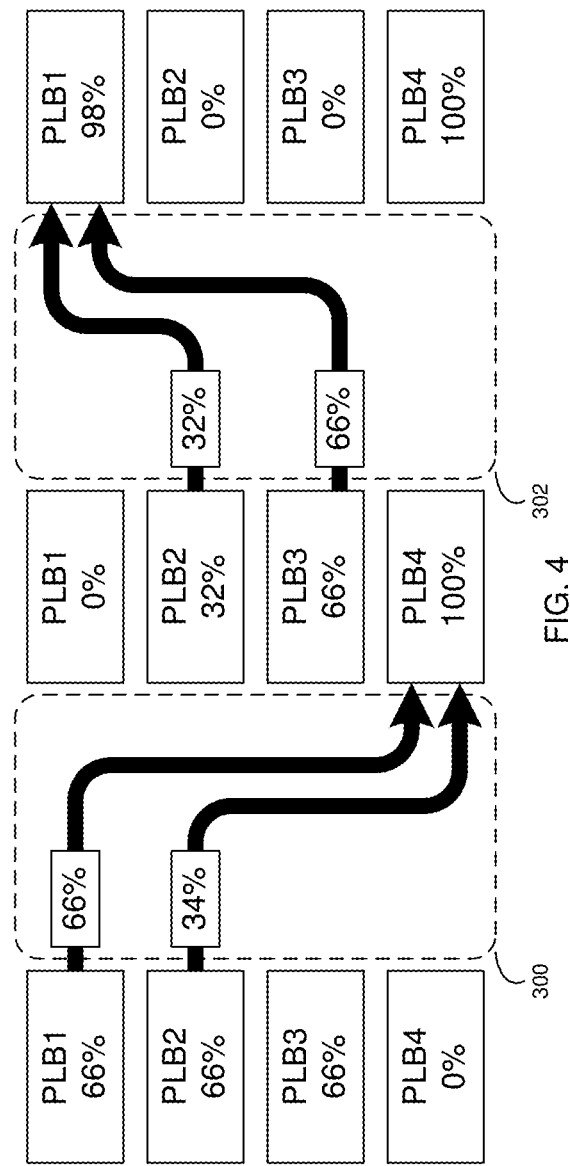
FIGS. 4-5 are diagrammatic views of an iterative process executed by the storage management process f FIG. 1.

Accordingly and referring also to FIG. 4, storage management process 10 may identify 200 a first memory device source (e.g., PLB1) that includes first content (represented as 66%). Further, storage management process 10 may identify 202 a second memory device source (e.g., PLB2) that includes second content (represented as 66%). Additionally, storage management process 10 may identify an unused memory device (e.g., PLB4) that may be used as a swap space into which content may be moved.

Storage management process 10 may initiate 204 a first iteration (e.g., first iteration 300) of a memory device cleansing procedure wherein first content (e.g., 66%) and at least a first portion of the second content (e.g., at least a first portion of 66%) are moved to the first unused memory device (e.g., PLB4). For example, assume that all of the 66% of PLB1 and 34% (of the 66%) of PLB2 are moved to PLB4. Accordingly and at the end of the first iteration (e.g., first iteration 300), PLB1 is @0%, PLB2 is @32% (i.e., 66%-34%) and PLB4 is @100%.

Storage management process 10 may identify 206 a third memory device source (e.g., PLB3) that includes third content (represented as 66%). Storage management process 10 may initiate 208 a second iteration (e.g., second iteration 302) of the memory device cleansing procedure wherein at least a second portion of the second content (e.g., the remaining 32% of the 66%) and at least a first portion of the third content (e.g., at least a first portion of 66%) are moved to a second unused memory device. In this example, the second unused memory device is PLB1, which is currently unused because the original content (e.g., 66%) of PLB1 was moved to PLB4. For this example, assume that all of the 66% of PLB3 and the remaining 32% of PLB2 are moved to PLB1. Accordingly and at the end of the second iteration (e.g., second iteration 302), PLB1 is @98%, PLB2 is @0%, PLB3 is @0%. and PLB4 is at 100%.

Therefore and through the above-described process, three partially utilized PLBs (e.g., PLB1, PLB2 & PLB3) and one unutilized PLB (e.g., PLB4) were transformed into two essentially fully utilized PLBs (e.g., PLB1 & PLB4) and two unutilized PLBs (e.g., PLB2 & PLB3), thus resulting in one additional unutilized PLB.

While storage management process 10 is described above as utilizing two iterations (e.g., first iteration 300 and second iteration 302) to free up an additional unused memory device, this is for illustrative purposes only and is not intended to be a limitation of this disclosure, as other configurations are possible. For example, storage management process 10 may require three or more iterations in order to free up an additional unused memory device, especially as the individual utilization levels of the PLBs increase.

Therefore, storage management process 10 may identify 210 additional memory device sources that include additional content and may initiate 212 additional iterations of the memory device cleansing procedure, wherein portions of the additional content may be moved from the additional memory device sources to additional unused memory devices. The following example will illustrate a situation in which three iterations are required to free up an additional unutilized memory PLB.

Figure 5:
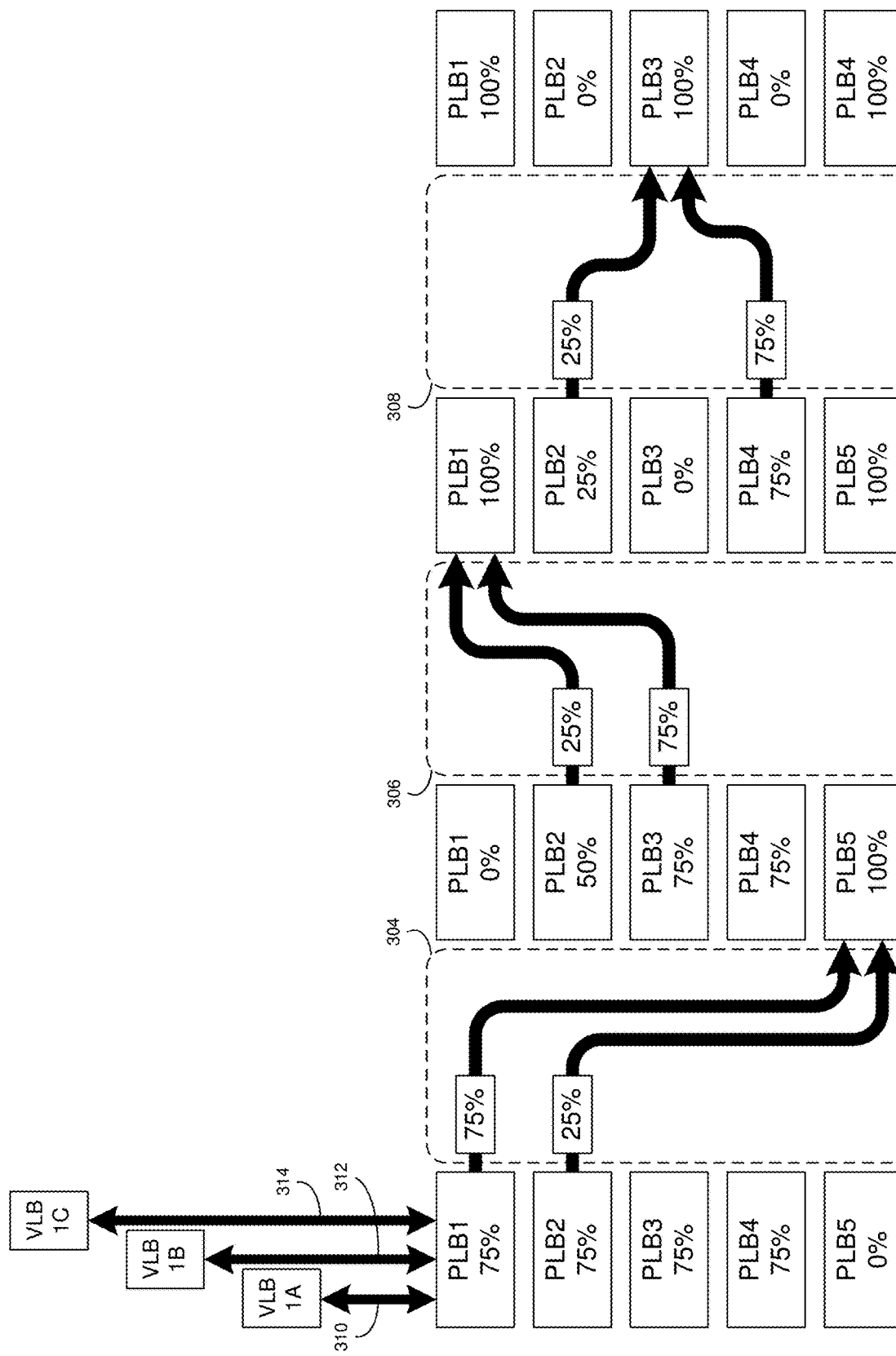

Accordingly and referring also to FIG. 5, storage management process 10 may identify a first memory device source (e.g., PLB1) that includes first content (represented as 75%). Further, storage management process 10 may identify a second memory device source (e.g., PLB2) that includes second content (represented as 75%). Additionally, storage management process 10 may identify an unused memory device (e.g., PLB5) that may be used as a swap space into which content may be moved.

Storage management process 10 may initiate a first iteration (e.g., first iteration 304) of the memory device cleansing procedure wherein first content (e.g., 75%) and at least a first portion of the second content (e.g., at least a first portion of 75%) are moved to the first unused memory device (e.g., PLB5). For example, assume that all of the 75% of PLB1 and 25% (of the 75%) of PLB2 are moved to PLB5. Accordingly and at the end of the first iteration (e.g., first iteration 304), PLB1 is @0%, PLB2 is @50% (i.e., 75%-25%) and PLB5 is @100%.

Storage management process 10 may identify a third memory device source (e.g., PLB3) that includes third content (represented as 75%). Storage management process 10 may initiate a second iteration (e.g., second iteration 306) of the memory device cleansing procedure wherein at least a second portion of the second content (e.g., 25% of the remaining 50% of the original 75%) and at least a first portion of the third content (e.g., at least a first portion of 75%) are moved to a second unused memory device. In this example, the second unused memory device is PLB1, which is currently unused because the original content (e.g., 75%) of PLB1 was moved to PLBS. For this example, assume that all of the 75% of PLB3 and 25% of the remaining 50% of PLB2 are moved to PLB1. Accordingly and at the end of the second iteration (e.g., second iteration 306), PLB1 is @100%, PLB2 is @25% (i.e., 50%-25%), PLB3 is @0%. and PLBS is at 100%.

Storage management process 10 may identify a fourth memory device source (e.g., PLB4) that includes fourth content (represented as 75%). Storage management process 10 may initiate a third iteration (e.g., third iteration 308) of the memory device cleansing procedure wherein at least a third portion of the second content (e.g., the remaining 25% of the original 75%) and at least a first portion of the fourth content (e.g., at least a first portion of 75%) are moved to a third unused memory device. In this example, the third unused memory device is PLB3, which is currently unused because the original content (e.g., 75%) of PLB3 was moved to PLB1. For this example, assume that all of the 75% of PLB4 and the remaining 25% of PLB2 are moved to PLB3. Accordingly and at the end of the third iteration (e.g., third iteration 308), PLB1 is @100%, PLB2 is @0%, PLB3 is @100%. PLB4 is at 0% and PLBS is @100%.

Therefore and through the above-described process, four partially utilized PLBs (e.g., PLB1, PLB2, PLB3 & PLB 4) and one unutilized PLB (e.g., PLBS) were transformed into three fully utilized PLBs (e.g., PLB1, PLB3 & PLBS) and two unutilized PLBs (e.g., PLB2 & PLB4), thus resulting in one additional unutilized PLB.

As discussed above, storage management process 10 may identify 200, 202, 206, 210 memory device sources (e.g., PLB1, PLB2, PLB3, PLB4) whose content may be combined in order to generate unutilized PLBs. As will be discussed below, storage management process 10 may examine various aspects of potential memory device sources when deciding which of these memory device sources to identify 200, 202, 206, 210 for processing.

RULE 1: For example and when identifying 200, 202, 206, 210 a memory device source (e.g., PLB1, PLB2, PLB3, PLB4), storage management process 10 may identify 214 a utilization level of the memory device source (e.g., PLB1, PLB2, PLB3, PLB4). For example, a memory device source may be identified 214 for processing if the utilization of that memory device source is compatible with (or complimentary of) the utilization of the memory device source with which it is being paired for processing. For example, a 50% utilized PLB pairs well with a 50% utilized PLB, a 40% utilized PLB pairs well with a 60% utilized PLB, a 30% utilized PLB pairs well with a 70% utilized PLB, a 20% utilized PLB pairs well with a 80% utilized PLB, and a 10% utilized PLB pairs well with a 90% utilized PLB.

As is known in the art, memory systems may utilize backpointers (e.g., backpointer 310) to identify portions of a virtual memory space (e.g., VLB1A) that are associated with portions of a physical memory space (e.g., PLB1). An example of such a physical memory space is a physical large block (i.e., a PLB), wherein an example of such a virtual memory space is a virtual large block (i.e., a VLB). Each of these PLBs (e.g., smaller portions 126) may include e.g., 512 4 k memory pages. A backpointer (e.g., backpointer 310) may be configured to map the physical memory space (e.g., PLB1) onto the virtual memory space (e.g., VLB1A). Specifically, a single backpointer (e.g., backpointer 310) may be capable of mapping 512 virtual memory pages within the virtual memory space (e.g., VLB1A) onto 512 physical memory pages within the physical memory space (e.g., PLB1). Further, each PLB may be capable of supporting additional backpointers (e.g., backpointers 312, 314). Typically, a PLB is capable of supporting up to 8 backpointers, thus allowing 4,096 virtual memory pages within the virtual memory space to be mapped onto 512 physical memory pages within the physical memory space (thus supporting data compression ratios of up to 8×).

RULE 2: When identifying 200, 202, 206, 210 a memory device source (e.g., PLB1, PLB2, PLB3, PLB4), storage management process 10 may identify 216 a backpointer utilization level for a backpointer (e.g., backpointer 310, backpointer 312 and/or backpointer 314) associated with the memory device source (e.g., PLB1, PLB2, PLB3, PLB4) based, at least in part, upon an *estimated* usage of the memory device source (e.g., PLB1, PLB2, PLB3, PLB4).

As shown in FIG. 5, PLB1 is shown to be 75% utilized, which may be an approximate utilization rounded off to the nearest 5% or 10%. Further, PLB1 is shown to include three backpointers (e.g., backpointers 310, 312, 314), which map to various VLBs (e.g., VLB1A, VLB1B and VLB1C respectively). Accordingly and when storage management process 10 identifies 216 a backpointer utilization level for a backpointer, storage management process 10 may divide the above-referenced 75% utilization by three (as there are three backpointers), thus *resulting in backpointers resulting in backpointers utilization of 25.0% each.*

RULE 3: Further and when identifying 200, 202, 206, 210 a memory device source (e.g., PLB1, PLB2, PLB3, PLB4), storage management process 10 may identify 218 a backpointer utilization level for a backpointer (e.g., backpointer 310) associated with the memory device source (e.g., PLB1, PLB2, PLB3, PLB4) based, at least in part, upon an actual usage of the memory device source (e.g., PLB1, PLB2, PLB3, PLB4).

For example, assume that PLB1 (which is capable of storing 2.00 mb of data) actually contains 1.41 mb of data. Accordingly, the actual utilization of PLB1 is 1.41 mb/2.00 mb or 70.50%. Again, PLB1 is shown to include three backpointers (e.g., backpointers 310, 312, 314), which map to various VLBs (e.g., VLB1A, VLB1B and VLB1C respectively). Accordingly and when storage management process 10 identifies 218 a backpointer utilization level for a backpointer, storage management process 10 may divide the above-referenced 70.50% utilization by three (as there are three backpointers), thus *resulting in backpointers 310, 312, 314 having a utilization of 23.5% each.*

RULE 4: Additionally and when identifying 200, 202, 206, 210 a memory device source (e.g., PLB1, PLB2, PLB3, PLB4), storage management process 10 may identify 220 a backpointer utilization level for a backpointer (e.g., backpointer 310) associated with the memory device source (e.g., PLB1, PLB2, PLB3, PLB4) based, at least in part, upon a mapped page count of the backpointer.

For example, again assume that the actual utilization of PLB1 is 1.41 mb/2.00 mb or 70.50%. Again, PLB1 is shown to include three backpointers (e.g., backpointers 310, 312, 314), which map to various VLB s (e.g., VLB1A, VLB1B and VLB1C respectively). However, storage management process may examine the actual number of memory pages that each of these backpointers (e.g., backpointers 310, 312, 314) map. Assume that backpointer 310 maps 480 memory pages, backpointer 312 maps 465 memory pages, and backpointer 314 maps 420 memory pages, which results in 1,365 memory pages being collectively mapped by the combination of backpointers (e.g., backpointers 310, 312, 314). Accordingly, *backpointer 310 has a unitization of 24.79%* (i.e., 480/1,365 (70.5%) *backpointer 312 has a unitization of 24.06%* (i.e., 165/1,365 (70.5%) and *backpointer 314 has a unitization of 21.69%* (i.e., 450/1,365 (70.5%).

Due to the manner in which RULES 2-3 are based upon a certain level of approximation, RULES 2-3 may often be skipped and RULE 4 may be relied upon due to its higher level of accuracy.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the blockdiagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    identifying a first memory device source that includes first content;
    identifying a second memory device source that include second content; and
    initiating a first iteration of a memory device cleansing procedure wherein the first content and at least a first portion of the second content are moved to a first unused memory device to generate an unutilized memory device source,
    wherein the first and the second memory device sources are identified for processing if a utilization level of the first memory device source is compatible with a utilization level of the second memory device source,
    wherein one or more of the identifying a first memory device source and a second memory device source includes identifying a backpointer utilization level fora backpointer associated with a respective memory device source based, at least in part, upon an estimated usage of the respective memory device source, and wherein the backpointer associated with the respective memory device source is configured to map a physical memory space of the respective memory device source to a virtual memory space of the respective memory device source.

2. The computer-implemented method of claim 1 further comprising:
identifying a third memory device source that includes third content; and
initiating a second iteration of the memory device cleansing procedure wherein at least a second portion of the second content and at least a first portion of the third content are moved to a second unused memory device.

3. The computer-implemented method of claim 2 further comprising:
identifying additional memory device sources that include additional content; and
initiating additional iterations of the memory device cleansing procedure wherein portions of the additional content are moved from the additional memory device sources to additional unused memory devices.

4. The computer-implemented method of claim 1 wherein one or more of the identifying a first memory device source and a second memory device source includes:
identifying a utilization level of the respective memory device source.

5. The computer-implemented method of claim 1 wherein one or more of the identifying a first memory device source and a second memory device source includes:
identifying a backpointer utilization level fora backpointer associated with the memory device source based, at least in part, upon an actual usage of the respective memory device source.

6. The computer-implemented method of claim 1 wherein identifying a first or second memory device source includes:
identifying a backpointer utilization level fora backpointer associated with the respective memory device source based, at least in part, upon a mapped page count of the backpointer.

7. A computer program product residing on a non-transitory computer readable medium having a plurality of instructions stored thereon which, when executed by a processor, cause the processor to perform operations comprising:
identifying a first memory device source that includes first content;
identifying a second memory device source that include second content; and
initiating a first iteration of a memory device cleansing procedure wherein first content and at least a first portion of the second content are moved to a first unused memory device to generate an unutilized memory device source,
wherein the first and the second memory device sources are identified for processing if a utilization level of the first memory device source is compatible with a utilization level of the second memory device source,
wherein one or more of the identifying a first memory device source and a second memory device source includes identifying a backpointer utilization level fora backpointer associated with a respective memory device source based, at least in part, upon an estimated usage of the respective memory device source, and
wherein the backpointer associated with the respective memory device source is configured to map a physical memory space of the respective memory device source to a virtual memory space of the respective memory device source.

8. The computer program product of claim 7 further comprising:
identifying a third memory device source that includes third content; and
initiating a second iteration of the memory device cleansing procedure wherein at least a second portion of the second content and at least a first portion of the third content are moved to a second unused memory device.

9. The computer program product of claim 8 further comprising:
identifying additional memory device sources that include additional content; and
initiating additional iterations of the memory device cleansing procedure wherein portions of the additional content are moved from the additional memory device sources to additional unused memory devices.

10. The computer program product of claim 7 wherein one or more of the identifying a first memory device source and a second memory device source includes:
identifying a utilization level of the respective memory device source.

11. The computer program product of claim 7 wherein one or more of the identifying first memory device source and a second memory device source includes:
identifying a backpointer utilization level fora backpointer associated with the respective memory device source based, at least in part, upon an actual usage of the one or more of the first memory device source and the second memory device source memory device source.

12. The computer program product of claim 7 wherein one or more of the identifying a first memory device source and a second memory device source includes:
identifying a backpointer utilization level fora backpointer associated with the respective memory device source based, at least in part, upon a mapped page count of the backpointer.

13. A computing system including a processor and memory configured to perform operations comprising:
identifying a first memory device source that includes first content;
identifying a second memory device source that include second content; and
initiating a first iteration of a memory device cleansing procedure wherein first content and at least a first portion of the second content are moved to a first unused memory device to generate an unutilized memory device source,
wherein the first and the second memory device sources are identified for processing if a utilization level of the first memory device source is compatible with a utilization level of the second memory device source,
wherein one or more of the identifying a first memory device source and a second memory device source includes identifying a backpointer utilization level fora backpointer associated with a respective memory device source based, at least in part, upon an estimated usage of the respective memory device source, and
wherein the backpointer associated with the respective memory device source is configured to map a physical memory space of the respective memory device source to a virtual memory space of the respective memory device source.

14. The computing system of claim 13 further comprising:
identifying a third memory device source that includes third content; and
initiating a second iteration of the memory device cleansing procedure wherein at least a second portion of the second content and at least a first portion of the third content are moved to a second unused memory device.

15. The computing system of claim 14 further comprising:
identifying additional memory device sources that include additional content; and
initiating additional iterations of the memory device cleansing procedure wherein portions of the additional content are moved from the additional memory device sources to additional unused memory devices.

16. The computing system of claim 13 wherein one or more of the identifying a first memory device source and a second memory device source includes:
identifying a utilization level of the respective memory device source.

17. The computing system of claim 13 wherein one or more of the identifying a first memory device source and a second memory device source includes:
identifying a backpointer utilization level fora backpointer associated with the respective memory device source based, at least in part, upon an actual usage of the respective memory device source.

18. The computing system of claim 13 wherein one or more of the identifying a first memory device source and a second memory device source includes:
identifying a backpointer utilization level fora backpointer associated with the respective memory device source based, at least in part, upon a mapped page count of the backpointer.

* * * * *